Nov. 20, 1962 R. V. CRAWFORD 3,065,397
ADJUSTABLE MOTOR SPEED CONTROL
Filed Dec. 18, 1956 3 Sheets-Sheet 2

DISCRETE ADDRESS SYSTEM
MOTOR SPEED CONTROL CIRCUIT

| FIG. 4 | FIG. 3 |
|---|---|
| FIG. 2 | |

INVENTOR
R. V. CRAWFORD
BY
John E Cassidy
ATTORNEY

INVENTOR
R. V. CRAWFORD
BY
John E. Cassidy
ATTORNEY

United States Patent Office 3,065,397
Patented Nov. 20, 1962

3,065,397
ADJUSTABLE MOTOR SPEED CONTROL
Robert V. Crawford, Dobbs Ferry, N.Y., assignor to Bell Telephone Laboratories, Incorporated, New York, N.Y., a corporation of New York
Filed Dec. 18, 1956, Ser. No. 629,433
3 Claims. (Cl. 318—231)

This invention, in one aspect, is a rotation speed control circuit for a variable speed electric motor by means of which the motor speed may be conveniently and accurately set for any desired rate within its range. The invention, in another aspect, is an indicator controlled by the motor, which indicates the rate at which the distance separating two objects is changing. In one preferred embodiment, one of these objects may be a mobile unit, for instance, such as a friendly airplane in flight and the other object may be a target, such as an enemy airplane in flight, which the friendly plane is directed to intercept by flying a prescribed course at an ordered speed. The indicator is driven by the motor at a speed proportional to the ordered speed of the controlled plane.

In such an embodiment it is contemplated that the information necessary to enable the directed plane to intercept the hostile plane, which information includes the direction of the line of flight, the altitude, the speed and the distance between the directed plane and the enemy plane, is first determined by radar and computation at a land station or on a ship, such as an airplane carrier, hereinafter termed a control station. Then this information is transmitted to the plane by radio telegraphy. The control station thus directs the friendly plane to fly toward a predetermined intercepting point in the path of the enemy plane at a rate of speed calculated to effect the interception.

It is desirable that there be a continuing indication at the control station of the distance separating the friendly plane and the point of interception. The present invention, in the illustrative embodiment disclosed herein, affords means whereby the speed of a variable speed motor at the control station may be conveniently set at any desired percentage of its maximum speed in discrete steps, and the motor may be employed to drive an indicator mechanism, which is first set to show the distance separating the friendly plane from the point of interception. Thereafter, the indicator is driven to a zero position, under control of the motor, the speed of which is set and maintained at a rate proportional to the rate of closure between the friendly plane and the interception point throughout the interval of interception. It should be understood that in other embodiments the speed of the motor may be set and maintained at a rate proportional to the actual rate of closure between the planes as calculated by well-known means.

It is particularly pointed out that the means by which the line of flight, altitude, and distance are determined are not a part of the present invention.

An object of the invention is the improvement of the control of the speed of a variable speed motor.

Another object of the invention is the provision of an indicator which may be set at any desired speed to indicate the distance separating a controlled moving object and an objective.

A feature of the invention is the control of the speed of a variable speed motor by the output of an oscillator, the rate of oscillation of which may be conveniently varied in discrete equal steps, 100 steps for instance, in the range of 0 to 100 cycles per second.

The invention may be understood from the following description when read in relation to the associated drawings which taken together show a preferred embodiment in which the invention is presently incorporated. It is to be understood, however, that the invention may be incorporated in other embodiments, as suggested above for example, which will become readily apparent to those skilled in the art. In the drawings:

FIG. 4 is a diagram showing how FIG. 2 and FIG. 3 should be disposed to form an operative circuit.

The invention will first be described generally with reference to the diagram of FIG. 1 and thereafter it will be described in detail with reference to the circuit drawings of FIG. 2 and FIG. 3.

Figure 1:
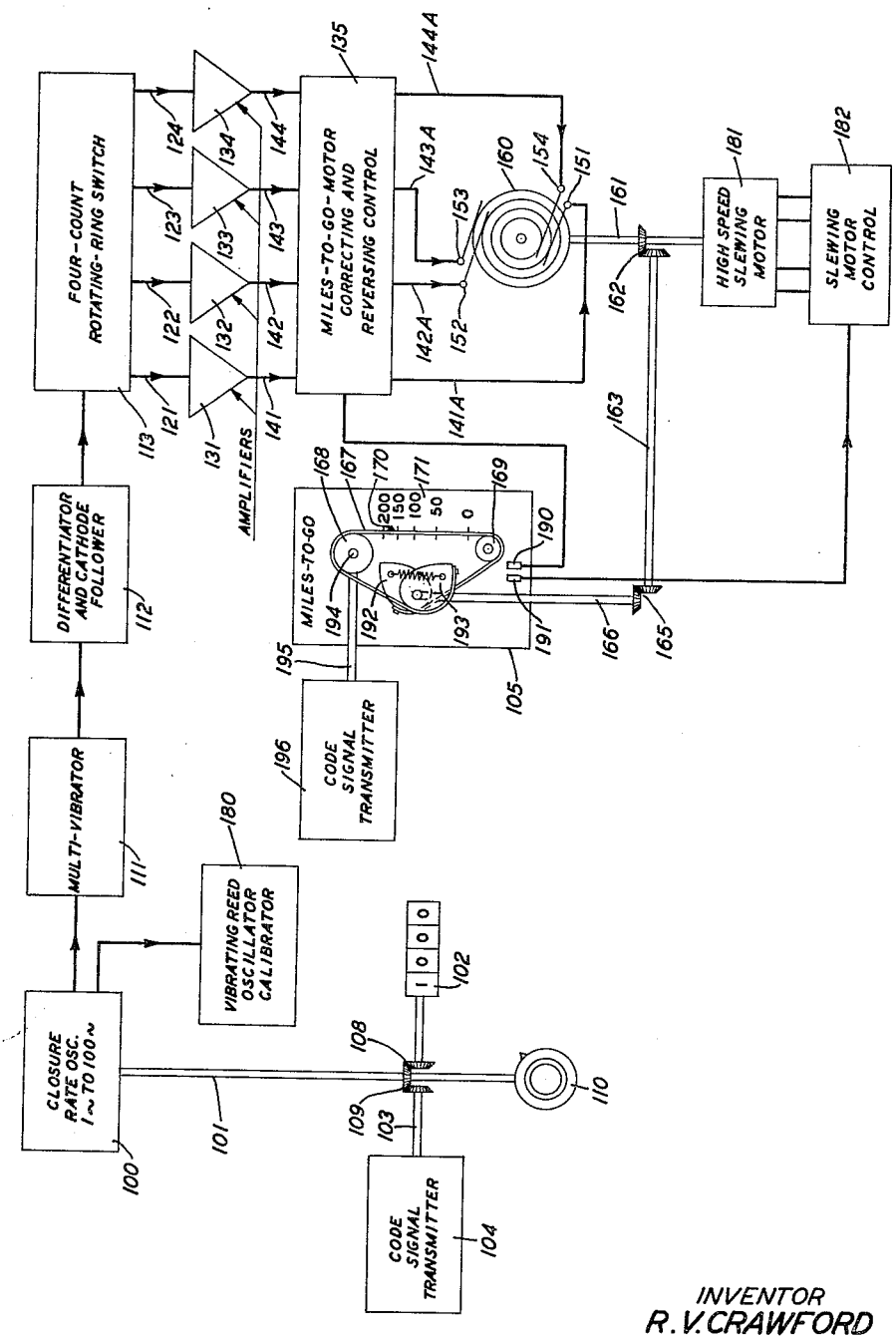
FIG. 1 is a diagrammatic sketch of a preferred embodiment of the invention.

Refer now to FIG. 1. At the upper left in FIG. 1 is shown a closure rate oscillator 100, the rate of oscillation of which may be varied in 100 equal discrete steps from 0 to 100 cycles per second. By way of example, any low frequency oscillator may be used which has provision for a one cycle change in frequency for each three-degree rotation of a control shaft from 0 to 300 degrees. The rate of oscillation of the oscillator is adjusted by means of a closure rate dial 110 by means of which shaft 101 may be rotated. The dial 110 may be set in any one of 100 rotary positions. The shaft 101, in turn, is adapted to control oscillator 100 in any well-known manner to produce a discrete frequency output for each of said 100 rotary positions. Thus the rate of oscillation is varied of the oscillator in 100 equal discrete steps from 0 to 100 cycles per second. Geared to shaft 101 through gears 108 is a progressive counter 102, which indicates the rate of closure with the interception point directly in miles per hour, for instance. As the circuit is arranged so that each of the divisions of the dial 110 effects a change of one cycle in the oscillator, which is translated by the other circuit elements into an indication of a closure rate change of ten miles per hour, for instance, the counter 102 may be arranged to indicate a range from zero to one thousand miles per hour, in 100 steps, each representing ten miles. Geared also to shaft 101 through gears 109 is shaft 103, which controls code signal transmitter 104. The code signal transmitter, which may be any one of a number well known in the art, is arranged to set up and transmit a distinctive individual multi-element permutation code signal combination for each of the hundred possible settings of dial 110 and corresponding discrete rates of oscillation of the oscillator 100. These code combinations are transmitted by radio telegraphy, for instance, to a friendly airplane in flight and serve as commands to the plane's pilot to operate the plane at the speed defined by the combination. This, with other information, such as line of flight and altitude, transmitted by other means, is intended to direct the plane to effect, for example, interception of a hostile plane.

At the time the information is sent, the control station has knowledge, through other means, such as radar, of the total distance required to be traversed to effect the interception. To anticipate, an indication of this distance is set up on an indicator 105, the function of which is to afford a continuous indication at all times during the intercepting process of the distance remaining to be traveled before interception is effected. This is achieved by first setting the indicator 105 to indicate the initial distance on a graduated scale and then driving the indicator toward a zero position under control of the motor, at a rate proportional to the speed at which the friendly plane has been commanded to fly.

To resume the general description, the output of the closure rate oscillator 100 is connected to a multivibrator circuit 111, which functions to transform the sine wave output of the closure rate oscillator 100 into what is essentially a square wave. The square wave is impressed on a differentiator and cathode follower circuit 112, which produces sharp narrow pulses or spikes required for operation of the four-count rotating ring circuit 113, which is arranged to function as a four-contact rotating switch and has four individual outputs 121, 122, 123, and 124, one for each of its four individual counting stages. Each of theses outputs is impressed on an individual amplifier 131, 132, 133, and 134. The individual outputs 141, 142, 143, and 144 of each of the amplifiers may be impressed through a miles-to-go motor correcting and reversing control circuit 135, or may be impressed directly on four individual windings of a two-phase variable speed motor 160. The miles-to-go motor correcting and reversing control circuit 135 is described in detail in Patent 2,879,460 issued March 24, 1959, to Robert V. Crawford and Frank J. Henneberg. This patent is hereby incorporated by reference as though fully set forth herein. It is particularly pointed out that the miles-to-go motor correcting and reversing control circuit 135 is a means of affording certain desirable additional controls for the present arrangement and an understanding of its operation is not necessary to an understanding of the present invention. The amplifier outputs 141, 142, 143, and 144 may be impressed directly on four individual winding terminals 151, 152, 153, and 154, respectively, of the two-phase motor 160. Each of the windings has a common inner terminal connected to a source of positive battery, not shown, which serves as a plate supply for each of amplifiers 131, 132, 133, and 134, which will be made apparent in the detailed description hereinafter. When the miles-to-go motor correcting and reversing control circuit 135 is employed, it is connected by means of four conductors 141A, 142A, 143A, and 144A, which correspond to conductors 141, 142, 143, and 144, respectively, to terminals 151, 152, 153, and 154, respectively.

For different interceptions, the command speed sent to a controlled plane may be changed by changing the setting of dial 110. The rate of oscillation of oscillator 100 changes responsively. The multivibrator 111 and differentiator and cathode follower 112 produce their characteristic outputs at corresponding rates. Each stage of the four-count rotating ring circuit 113 sends a pulse to its amplifier, once every fourth cycle of the oscillator. These, when impressed on the four individual windings of the motor, actuate its rotor through a fixed angle for each pulse. The angle remains the same for each pulse notwithstanding the differing rates at which the pulses may be impressed on the motor. The rate of rotation of the motor is therefore directly proportional to the rate of oscillation of the oscillator.

The motor 160 is coupled through shaft 161, gears 162, shaft 163, gears 165, and shaft 166 to the miles-to-go indicator 105. Secured to the shaft 166 in indicator 105 is a belt driving wheel, not shown, which drives a belt 167. The belt 167 passes over two idler wheels 168 and 169. Secured to the belt is an indicator pointer 170, which is actuated in a path in registry with a graduated scale 171, marked with numbers indicating miles-to-go. The indicator pointer 170 may be set by hand, for instance, or under control of the miles-to-go motor correcting and reversing control circuit 135, to any initial position on the scale in registry with a number indicating miles to go. As the system is operated, the indicator pointer 170 is driven, at a rate proportional to the setting of the oscillator, from its initial position toward the zero position on the scale. The indicator shows at any time the miles remaining to be traversed and the speed of its movement affords a visual indication of the rate of closure.

FIG. 1 shows also certain additional features. The oscillator may be provided with calibrating means 180, such as a vibrating reed oscillator, for instance. The indicator 105 may be jointly controlled by means of a high speed slewing motor 181 through a slewing motor control 182. These may be in turn controlled by means of limiting switch contacts 190 and 191 closed in any suitable fashion under the control of cams 192 and 193. One example of such an arrangement is disclosed in FIG. 2 of aforementioned Patent 2,879,460. These elements cooperate to limit the movement of belt 167 and of indicator 170 at the extreme ends of the scale 171. The high speed slewing motor 181 functions to actuate the belt 167 and the pointer 170 at high speed either in the normal forward direction or in the reverse from normal direction, when required, under control of the reversing control circuit 135.

It is contemplated that the controlled plane also will be furnished with means for providing a continuous indication of the miles-to-go to the target. In order to control this mechanism in the plane, permutation code signal combinations will be produced in code signal transmitter 196 which is coupled through shaft 195 and gears, not shown, to shaft 194, to which idler 168 is secured. As shaft 194 is rotated, a succession of multielement permutation code signal combinations are transmitted, in any of a number of manners well known to those skilled in the art, defining successive decreasing distances remaining to be traversed by the controlled plane, so that the plane pilot may be constantly informed of his nearness to his objective.

The operation of the circuit will now be described in detail. Refer now to FIGS. 2 and 3 disposed as shown in FIG. 4. It is to be understood that the values of the constants cited in the following are by way of example only and are not to be considered as limitations.

Figure 2:
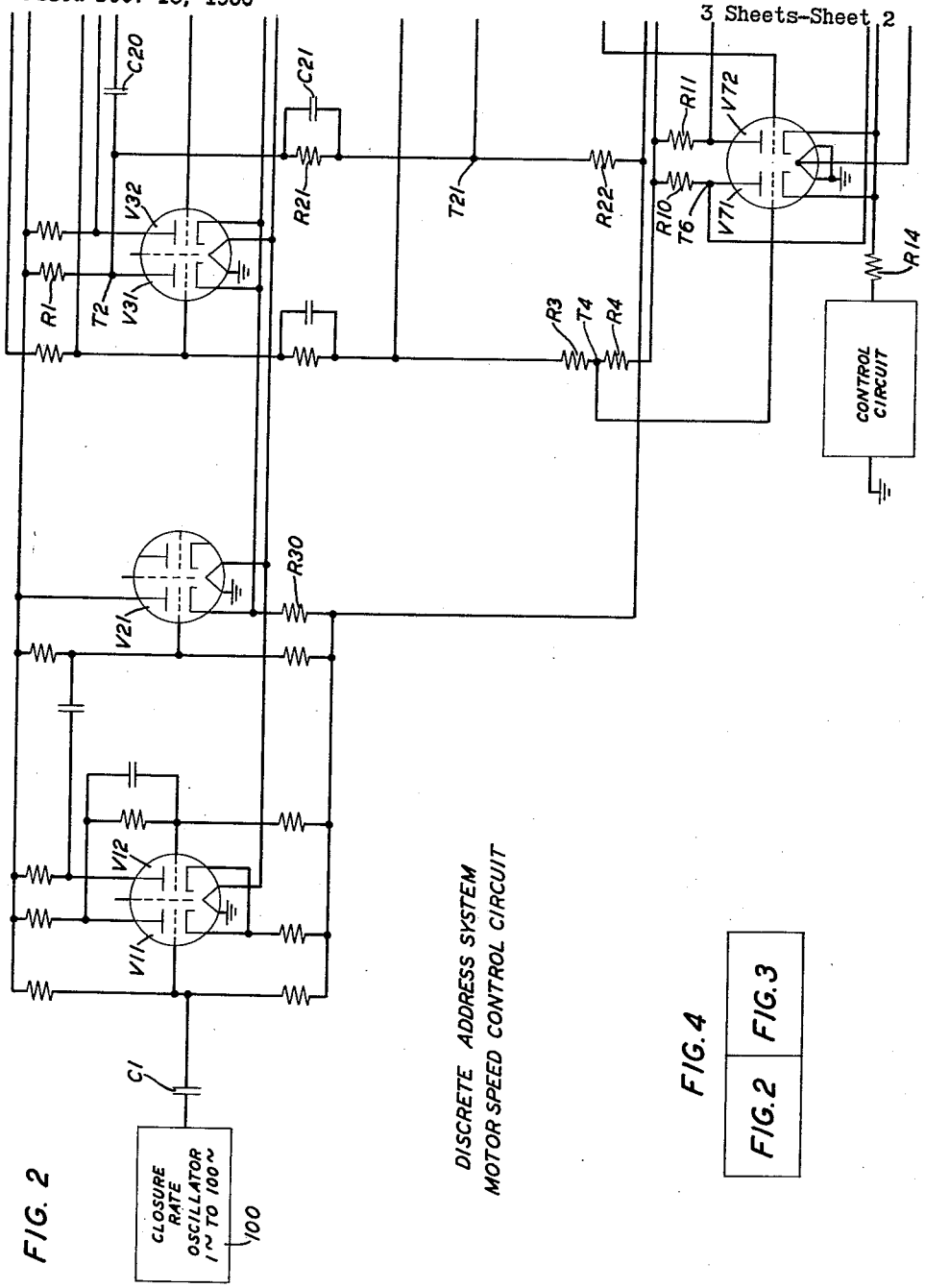
FIG. 2 shows the left-hand half of the circuit of the invention.
Figure 3:
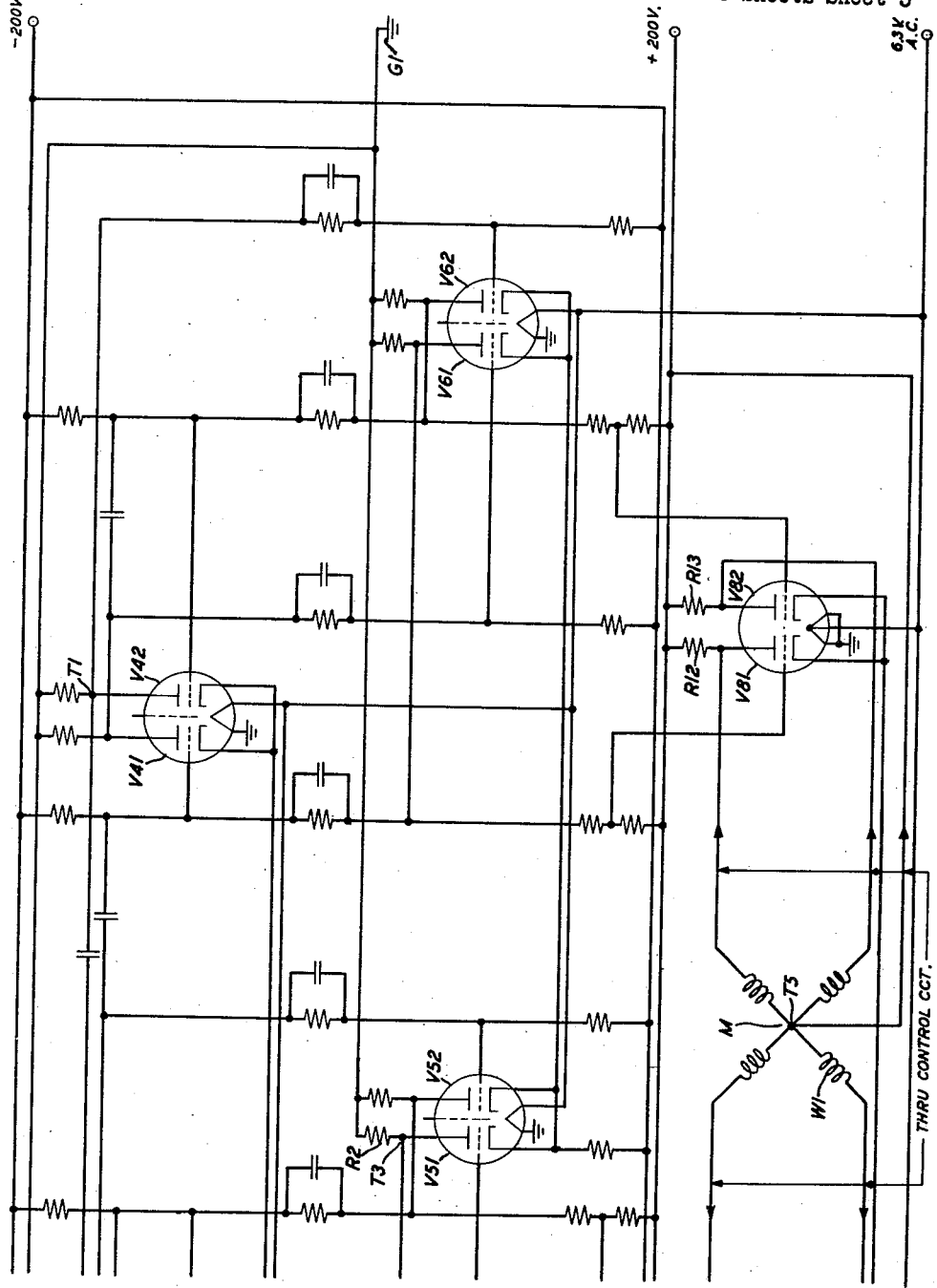
FIG. 3 shows the right-hand half of the circuit of the invention.

The circuit of FIGS. 2 and 3 comprises fifteen triodes, fourteen of which may be arranged, as shown, as units of double triodes, and the fifteenth as one unit of a double triode with the second unit unused.

The output of the closure rate oscillator 100 is connected through capacitor C1 to the input of triode V11. Triode V11 and triode V12 are arranged as a multivibrator circuit and transform the sine wave output of the closure rate oscillator into what is essentially a square wave. This square wave signal is impressed in turn on the input of triode V21, which is arranged as a differentiating network and cathode follower circuit, and which produces sharp narrow pulses or spikes required for the operation of the four-count ring circuit.

The four-count ring circuit comprises triodes V31, V32, V41, and V42. These four triodes function as commutating tubes in a ring circuit. In this ring circuit, plate current flows in only one of the four triodes during any one cycle of an input pulse from differentiator and cathode follower V21. In response to each input pulse from the cathode of triode V21, one triode of the group of the four triodes in the ring circuit is activated. The triodes are activated in sequence. If it is assumed, for instance, that triode V42 was last activated, the following pulse activates triode V31 and inactivates triode V42. The next succeeding pulse will activate triode V32 and inactivate triode V31. The third pulse activates triode V41 and inactivates triode V32. The fourth pulse activates triode V42 and inactivates triode V41. Then the cycle is repeated.

In order to arrange the counting circuit so that it is reentrant, terminal T1 in the output circuit of the fourth triode V42 of the group is connected to the grid of the first triode V31 of the group. The four triodes V51, V52, V61 and V62 are controlled by triodes V31, V32, V41, and V42, respectively, in such manner that when plate current flows in any of the triodes of the four triodes in the counting group, triode V31, for example, the plate current in the corresponding control triode V51 is cut off. Plate current will flow in each of the other three triodes V52, V61 and V62, since their respective control triodes will be inactivated at the time. It will be observed that the input circuit of each of triodes V51, V52, V61 and V62 is connected to an individual voltage divider circuit. For triode V51 this circuit may be traced from ground through resistor R1, resistor R21 and capacitor C21, in parallel, and resistor R22 to negative battery. When current flows in the plate circuit of the respective control triode, such as triode V31, the potential of a terminal, such as terminal T2, and responsively of terminal T21 become more negative, cutting off the controlled triode, such as triode V51. Whenever current does not flow in the plate circuit of a controlling triode such as triode V31, the potential of the terminal such as terminal T2, and responsively of terminal T21, become more positive and the controlled triode such as triode V51 responsively conducts through its plate circuit. As mentioned heretofore, only one of the counting triodes is activated at any time while three are cut off. Conversely, therefore, only one of the triodes in the controlled group V51, V52, V61, and V62 will be cut off at any one time while the other three conduct.

The function of the four triodes V71, V72, V81 and V82 is to serve as amplifiers of the current supplied to the four windings of the two-phase variable speed motor M. Triodes V71, V72, V81, and V82 are each controlled by triodes V51, V52, V61, and V62 respectively. The output circuit of each one of tubes V51, V52, V61, and V62 is connected to the input of triodes V71, V72, V81, and V82 respectively. For instance, terminal T3 in the plate circuit of triode V51 is connected in a voltage divider circuit which may be traced from ground through resistor R2, resistor R3, and resistor R4 to a source of positive potential such as positive 200 volts. The grid of triode V71 is connected to terminal T4 in the voltage divider circuit. Each one of the other triodes V72, V81, and V82 is similarly connected in another such voltage divider circuit, so that each is controlled by its individual controlling triode. When any of the four triodes V51, V52, V61, and V62 conducts, the potential of the terminal corresponding to terminal T3 becomes more negative and the controlled triode, such as triode V71, is cut off. When current does not flow in the plate circuit of a triode such as triode V51, the potential of the terminal such as terminal T3 becomes more positive and the controlled triode, such as triode V71, conducts. Since, at any time, three triodes of the group V51, V52, V61, and V62 are conducting and one is cut off, three triodes of the group V71, V72, V81, and V82 will be cut off and one will be conducting at any time.

A path may be traced from a source of positive potential, positive 200 volts for instance, to terminal T5 which is a common inner terminal of the four windings of the motor M. From terminal T5 one branch of the circuit extends through winding W1 to terminal T6 in the plate circuit of triode V71. A corresponding circuit may be traced from terminal T5 through each of the other three windings of the motor M to a terminal in the output circuit in each of triodes V72, V81, and V82. A circuit may be traced from positive battery through resistors R10, R11, R12, and R13 in parallel to the anodes of triodes V71, V72, V81, and V82 and from the anodes to the cathodes and through common cathode resistor R14 to ground. As each of the four triodes V71, V72, V81, and V82 conducts in turn, current will flow in parallel from the positive voltage source through the resistor, such as resistor R10, and the winding, such as the winding W1, to the anode of the triode, such as triode V71, and from the anode to its cathode and through resistor R14 to ground. When the triode is cut off, no current flows in the winding such as winding W1. As each one of triodes V71, V72, V81, and V82 is activated in turn, current will flow through an individual one of the four windings of motor M. The windings and the tubes will be connected in such manner that the pulses are applied to the motor windings in proper sequence to rotate the rotor of the motor.

The variable speed motor is preferably a low speed synchronous inductor motor arranged for two-phase operation from a 60 cycles per second source, which may also be operated from a four-contact direct-current pulsing source. A motor which has been found satisfactory for this purpose is a General Electric synchronous inductor motor 5SMY20J. The stator of this motor consists of two bobbins, each bobbin having its inner periphery divided into two rings of 36 poles. The rotor consists of four discs, each disc having 36 salient poles, mounted in pairs, on the opposite ends of a small cylindrical magnet concentric with the armature shaft. This motor is capable of responding to pulse-type operation and, as used in this control system, steps ahead 2½ degrees on each pulse and then, due to the permanent magnet salient pole rotor construction, remains locked in position until reset by the following pulse.

A further word of explanation of how the four triodes V31, V32, V41 and V42 in the counting ring are controlled by the cathode follower V21 will now be added. Whenever cathode follower V21 is activated, the potential of its cathode rises sharply in the positive direction. That this is so may be understood by observing that when triode V21 is nonconducting, the potential of its cathode in approximately minus 200 volts, for instance, while its plate is connected directly to ground. There is no plate resistor in the circuit. The resistance of cathode resistor R30 may be 16,000 ohms, for instance. Therefore, the potential of the cathode of triode V21 after the firing of triode V21 is changed to a value which is negative with respect to ground only by an amount equal to the potential drop through the tube. This changed potential of the cathode of triode V21 represents a substantial increase in the positive indirection. The cathode of cathode follower V21 is connected in parallel to the cathode of each of the four counting tubes V31, V32, V41, and V42 which it directly controls. It will be observed that each of the counting tubes, such as triode V31, has a resistor, such as resistor R1, in its plate circuit, the outer terminal of which resistor is at ground potential, so that when any of the counting triodes is conducting, the potential of its plate may be made less positive than the potential of the cathode of the cathode follower V21 when the cathode follower is conducting. Since the cathodes of all of the counting triodes V31, V32, V41, and V42 are driven greatly in a positive direction when cathode follower V21 fires, the single triode of the four counting triodes V31, V32, V41, and V42 which is conducting at the moment will be inactivated. It has been explained that the pulse produced by the cathode follower V21 is of short duration. It is effective to extinguish the single activated counting tube, but it does not persist substantially longer than is necessary to achieve this. At the instant that the single activated counting triode is inactivated, all four of the counting triodes are momentarily inactivated. Activation of the succeeding triode in the ring is due to the effect of the capacitor, corresponding to capacitor C20, in the path interconnecting the plate of each triode to the grid of the next, such as the plate of triode V31 to the grid of triode V32.

Assuming that triode V31 is the triode which is momentarily conducting, when it is inactivated, its plate will swing positive and a positive pulse will be passed through capacitor C20 to the grid of triode V32. The magnitude of the capacitance of capacitor C20 and of the other elements in the circuit are so chosen that the duration and magnitude of the positive pulse are large enough to insure that triode V32 is activated after triode V31 is inactivated. Each of the other triodes of the counting circuit is similarly arranged. The result is that as each triode in the ring is inactivated, the next succeeding triode is actviated, all under control of the cathode follower V21.

It is pointed out that, although in the foregoing it was assumed that the oscillator control was arranged to change the rate of oscillation in discrete equal steps, the control may be arranged, by a proper choice of resistor elements, or otherwise, to change the rate of oscillation, and hence of rotation of the motor and of movement of the indicator, in any of a number of other manners, for example, non-linearly, such as logarithmically, or exponentially, or otherwise, as desired.

What is claimed is:

1. A rotation speed control system for a motor, said system comprising an oscillator, means connected to said oscillator for changing the rate of oscillation of said oscillator in a plurality of discrete steps, a ring circuit connected to said oscillator, said ring circuit having a plurality of individual stages, a stepping motor having a number of windings corresponding to said number of stages, said stages connected individually to said windings, means responsive to the oscillations of said oscillator for successively activating each of said stages, and means responsive to the activation of said stages for rotating said motor.

2. A rotation speed control system for a motor, said system comprising a motor having $n$ windings, where $n$ is a positive integer, a counting ring circuit having $n$ stages, means for impressing a sequence of pulses on said ring circuit, means impressing individual pulses in sequence from each of said stages on each of said windings, and means for varying the speed at which said pulses are impressed on said ring circuit to vary the speed of said motor.

3. An oscillator having means connected thereto for varying the rate of oscillation of said oscillator in a plurality of equal steps, a multivibrator connected for operation in response to said oscillator, a differentiator connected for operation in response to said multivibrator, a counting ring circuit connected to the output of said differentiator and having a plurality of output connections, and a stepping motor having a plurality of windings connected to said ring circuit output connection, respectively.

References Cited in the file of this patent
UNITED STATES PATENTS

| | | |
|---|---|---|
| 2,340,875 | Gibbs | Feb. 8, 1944 |
| 2,540,076 | Dicke | Feb. 6, 1951 |
| 2,604,520 | Andresen | July 22, 1952 |
| 2,625,672 | Calvert | Jan. 13, 1953 |
| 2,706,270 | Steele | Apr. 12, 1955 |
| 2,710,372 | McCleery | June 7, 1955 |
| 2,776,425 | Altman | Jan. 1, 1957 |
| 2,784,365 | Fenemore et al. | Mar. 5, 1957 |
| 2,791,734 | Kieffert | May 7, 1957 |
| 2,879,460 | Crawford | Mar. 24, 1959 |